(12) United States Patent
Olster

(10) Patent No.: US 8,874,956 B2
(45) Date of Patent: Oct. 28, 2014

(54) DATA RE-PROTECTION IN A DISTRIBUTED REPLICATED DATA STORAGE SYSTEM

(71) Applicant: Dan Olster, Oak Park, CA (US)

(72) Inventor: Dan Olster, Oak Park, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 302 days.

(21) Appl. No.: 13/622,298

(22) Filed: Sep. 18, 2012

(65) Prior Publication Data

US 2014/0082414 A1    Mar. 20, 2014

(51) Int. Cl.
*G06F 11/00*       (2006.01)

(52) U.S. Cl.
USPC ........................................... 714/6.1

(58) Field of Classification Search
USPC .................................. 714/4.1, 6.1
See application file for complete search history.

(56) References Cited

U.S. PATENT DOCUMENTS

| | | | |
|---|---|---|---|
| 4,092,732 A | 5/1978 | Ouchi | |
| 4,761,785 A | 8/1988 | Clark et al. | |
| 5,208,813 A | 5/1993 | Stallmo | |
| 5,390,187 A | 2/1995 | Stallmo | |
| 5,504,892 A | 4/1996 | Atsatt et al. | |
| 5,758,153 A | 5/1998 | Atsatt et al. | |
| 6,154,853 A | 11/2000 | Kedem | |
| 6,442,659 B1 | 8/2002 | Blumenau | |
| 6,658,439 B2 | 12/2003 | Karasudani | |
| 7,047,376 B2 * | 5/2006 | Horiuchi ....................... | 711/161 |
| RE39,421 E | 12/2006 | Stolowitz | |
| 7,370,228 B2 * | 5/2008 | Takahashi et al. ........... | 714/6.21 |
| 7,421,614 B2 * | 9/2008 | Watanabe ...................... | 714/6.1 |
| 7,454,655 B2 * | 11/2008 | Werner et al. .................. | 714/18 |
| 7,480,827 B2 * | 1/2009 | Callaway et al. ............ | 714/6.3 |
| 7,809,906 B2 * | 10/2010 | Eguchi et al. ................. | 711/162 |
| 8,090,977 B2 * | 1/2012 | Bulusu et al. ................. | 714/6.1 |
| 8,250,202 B2 * | 8/2012 | Kaminsky et al. ............ | 709/224 |
| 8,600,945 B1 * | 12/2013 | Natanzon et al. ............ | 707/648 |
| 8,775,753 B2 * | 7/2014 | Gundy et al. ................. | 711/162 |
| 8,788,877 B2 * | 7/2014 | Blea et al. .................... | 714/6.23 |
| 2001/0016841 A1 | 8/2001 | Karasudani | |
| 2003/0115438 A1 | 6/2003 | Mahalingam et al. | |
| 2004/0098383 A1 | 5/2004 | Tabellion et al. | |

(Continued)

OTHER PUBLICATIONS

Berriman, et al., Netapp Raid-DP: Dual-Parity Raid 6 Protection Without Compromise, WP-7005-1006, Oct. 2006, pp. 1-11.

(Continued)

*Primary Examiner* — Bryce Bonzo
(74) *Attorney, Agent, or Firm* — SoCal IP Law Group LLP; Mark A. Goldstein

(57) ABSTRACT

Data re-protection in a distributed replicated data storage system is disclosed. The method may be implemented on a server or controller. A method includes storing first data in a first zone and storing a replica of the first data in a second zone. The zones are at different, separate locations. When an actual or impending failure with the first data in the first zone is detected, the system automatically initiates transitioning to a copy of impacted data at the first zone obtained from the second zone. The transitioning includes creating a remote copy of the impacted data at the second zone within a local area network before transferring the copy to the first zone over a wide area network. The methods allow the system to return to a fully protected state faster than if the impacted data was transferred from the second zone to the first zone without making a copy at the second zone.

30 Claims, 3 Drawing Sheets

© 2012 DataDirect Networks

(56) References Cited

U.S. PATENT DOCUMENTS

| | | | |
|---|---|---|---|
| 2004/0236769 | A1 | 11/2004 | Smith et al. |
| 2005/0216502 | A1 | 9/2005 | Kaura et al. |
| 2011/0078494 | A1* | 3/2011 | Maki et al. .................... 714/6.12 |
| 2012/0284555 | A1* | 11/2012 | Akirav et al. .................. 714/4.1 |
| 2012/0303999 | A1* | 11/2012 | Calder et al. ................... 714/6.3 |
| 2013/0024720 | A1* | 1/2013 | Aggarwal et al. ............. 714/4.11 |
| 2013/0036326 | A1* | 2/2013 | Blea et al. ....................... 714/6.3 |
| 2013/0067268 | A1* | 3/2013 | Zuk et al. ...................... 714/4.11 |
| 2013/0091377 | A1* | 4/2013 | Taylor et al. .................. 714/4.11 |
| 2013/0254587 | A1* | 9/2013 | Han et al. ....................... 714/4.4 |
| 2014/0136880 | A1* | 5/2014 | Shankar et al. .............. 714/4.11 |
| 2014/0195846 | A1* | 7/2014 | Resch et al. ................. 714/6.22 |

OTHER PUBLICATIONS

Celeros, Bringing SANity to Storage Costs, RAID White Paper, Jan. 2007.

Chen et al, RAID: High-Performance, Reliable Secondary Storage, AMC Computing Surveys, vol. 26, No. 2, Jun. 1994, pp. 145-185.

DataDirect Networks, DataDirect Networks S2A9550: High-Performance, Resilient Storage for High-Performance Computing (HPC), White Paper, Sep. 2007, pp. 1-12.

DataDirect Networks, Best Practices: Enterprise SATA Deployment with High Performance and Reliability, White Paper, Dec. 2007, pp. 1-12.

EMC, EMC CLARiiON Raid 6 Technology, White Paper, Jul. 2007, pp. 1-14.

MPSTOR, RAID 50 Interleave, White Paper, Xtore Extreme Storage, Nov. 2006, pp. 1-13.

Patterson, et al., A Case for Redundant Arrays of Inexpensive Disks (RAID), Computer Science Division, Department of Electrical Engineering and Computer Sciences, pp. 1-25.

Pivot3, Pivot3 RAIGE Storage Cluster, White Paper, Technology Overview, Feb. 2007, pp. 1-18.

Storage, Best Storage Products of 2007, issued Feb. 2008, accessed on Apr. 22, 2008, http://searchstorage.techtarget.com/magazinePrintFriendly/0,296905,sid5_gci1299110,00.html.

WinchesterSystems, Technology Update White Paper "Enterprise RAID 6", May 4, 2006, pp. 1-14.

Du, et al., Experiences Building and Object-Based Storage System Based on the OSD T-10 Standard, DTC Intellient Storage Consortium, University of Minnesota, 2006, pp. 1-11.

Moore, et al., Storage Resource Broker Global Data Grids, San Diego Supercomputer Center, 2006, pp. 1-12.

Devulapalli, et al., Integrating Parallel File Systems with Object-Based Storage Devices, Ohio Supercomputer Center, pp. 1-10.

Smolik, An Opject-Oriented File System—An Example of Using the Class Hierarchy Framework Concept, Department of Computer Sciences, University of Missouri—Rolla, pp. 33-53.

Olson, et al., Secure Capabilities for a Petabyte-Scale object-Based Distributed File System, Storage System Research Center, Computer Science Department, University of California, Santa Cruz, pp. 64-73.

Marsden et al., improving the Usability of the Hierarchical File System, Department of Computer Science, University of Cape Town and University of Stirling, Proceedings of SAICSIT 2003, pp. 122-129.

Gaffey, SGI's Cluster File System—CXFS, File Systems Engineering, Apr. 9, 2000, slides 1-56.

Foster, Global data Services, Developing Data-Intensive Applications Using Globus Software, Computation Institute Argonne National Lab & University of Chicago, slides 1-114.

Pollack et al., Efficient Access Control for Distributed Hierarchical File Systems, University of California, Santa Cruz, slides 1-9.

Pollack et al., Efficient Access Control for Distributed Hierarchical File Systems, University of California, Santa Cruz, 2005, Journal, pp. 101-108.

Shinkai et al., Alternative Implementations of Cluster File Systems, MMS Conference, Mar. 2000, slides 1-16.

Rogers et al., z/OS Distributed File Service zSeries File System Implementation z/OS V1R11, Oct. 2009, Redbooks, IBM, International Technical Support Organization, Draft Document, Nov. 24, 2009, pp. 1-458.

Pike et al., The Styx Architecture for Distributed Systems, Computing Science Research Center, Bell Labs Technical Journal, vol. 4, No. 2, Apr.-Jun. 1999, pp. 1-11.

Welch et al., Object-Based Cluster Storage Systems, Panasas, Inc., May 25, 2006, slides 1-104.

* cited by examiner

_US 8,874,956 B2_

DATA RE-PROTECTION IN A DISTRIBUTED REPLICATED DATA STORAGE SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a distributed replicated data storage system and the re-protection of the data.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and silicon storage devices.

Various applications may store large numbers of documents, images, videos and other as data as objects using a distributed replicated data storage system in which data is replicated and stored in at least two locations.

DETAILED DESCRIPTION

Environment

Figure 1:
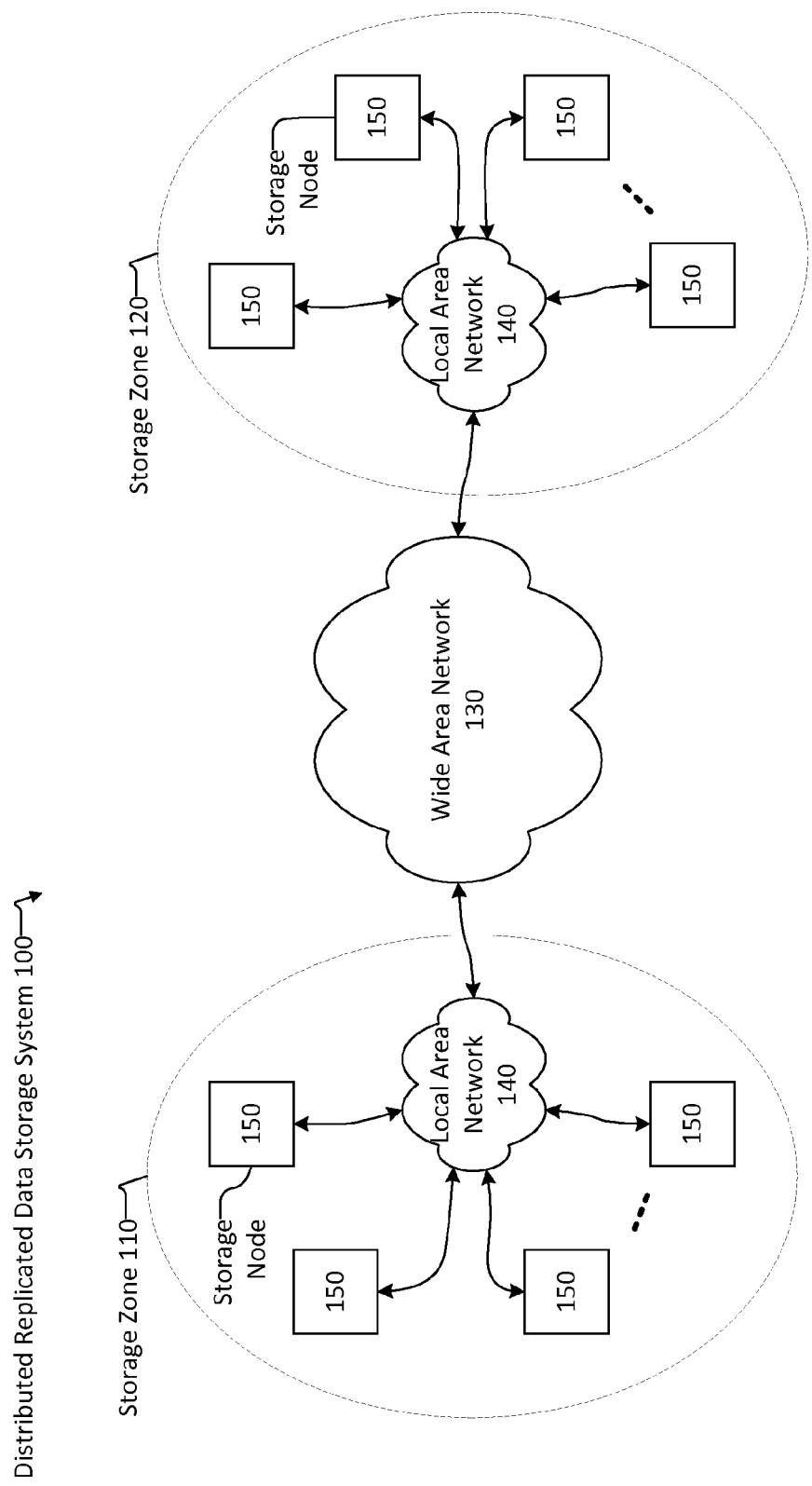
FIG. 1 is a block diagram of a distributed replicated data storage system.

FIG. 1 is a block diagram of a distributed replicated data storage system 100. The distributed replicated data storage system 100 includes at least two storage zones. In the example shown, the distributed replicated data storage system 100 includes two storage zones, first storage zone 110 and second storage zone 120. The storage zones may be replicated such that all copies of stored data are accessed and used in normal operation of the storage system. This is referred to herein as a fully active storage system or an active-active storage system. In a fully active storage system, all stored data is accessed from any or all of the storage zones based on various system rules. In a fully active configuration, as shown in FIG. 1, the storage zones 110 and 120 may be replicated such that copies of data in both storage zones are accessed and used in normal operation of the storage system.

In another embodiment, the storage zones 110 and 120 may be configured such that the first storage zone is a primary storage zone and the second storage zone is a secondary or backup. This is referred to herein as an active-passive storage system. In this embodiment, stored data is accessed from the primary storage zone, and the secondary storage zone may be accessed as needed such as when there is a problem or failure in the primary storage zone. The accessing of data from the secondary storage zone may be based on system rules.

The storage zones 110 and 120 are separated geographically. The storage zones 110 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The term data as used herein includes a bit, byte, word, block, stripe or other unit of information. In one embodiment the data is stored within and by the distributed replicated data storage system as objects. As used herein, the term data is inclusive of entire files or portions of a computer readable file. The computer readable file may include or represent text, numbers, data, images, photographs, graphics, audio, video, computer programs, computer source code, computer object code, executable computer code, and/or a combination of these and similar information. Many data intensive applications store a large quantity of data, these applications include scientific applications, newspaper and magazine websites (for example, nytimes.com and life.com), scientific lab data capturing and analysis programs, video and film creation software, and consumer web based applications such as social networking websites (for example, FACEBOOK), photo sharing websites (for example, FLIKR), video sharing websites (for example, YOUTUBE) and music sharing websites (for example, ITUNES).

Figure 2:
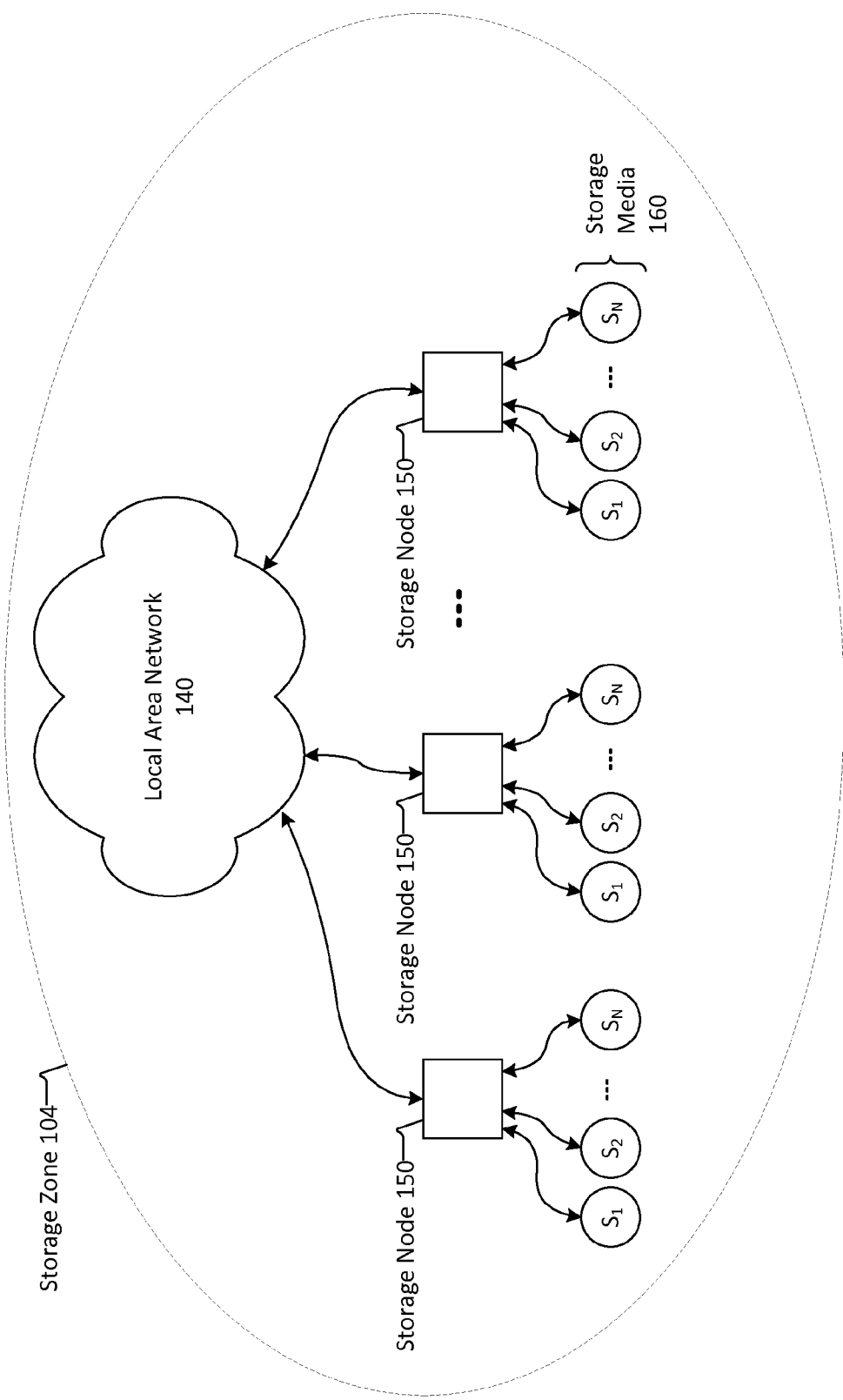
FIG. 2 is a block diagram of a storage zone included in a distributed replicated data storage system.

FIG. 2 is a block diagram of a storage zone 104 included in a distributed replicated data storage system. The storage zones 110 and 120 shown in FIG. 1 are examples of storage zone 104. The storage nodes 150 within a storage zone 104 may be connected via a local area network 140 by wire lines, optical fiber cables, wireless communication connections, and others, and may be a combination of these. The local area network 140 may include one or more networking devices such as routers, hubs, switches and the like.

Referring again to FIG. 1, the storage zone 110 may include an object management system and/or application program that automatically identifies and adapts to impairments in the storage nodes 150. That is, software in the storage zone 110 may monitor and recognize storage node failures; storage device failures; storage nodes with diminished capacity such as one or more down or diminished drives; storage devices with diminished capacity such as bad blocks or sectors; other equipment failures; offline nodes; offline storage devices; missing data; impaired data; and other system anomalies. When the software in the storage zone 110 recognizes an impairment, the distributed replicated data storage system may automatically adapt by accessing replicas or backups of data from a geographically separate storage zone 120. In a related embodiment, the distributed replicated data storage system 100 may include an application program that automatically identifies impairments in constituent storage zones and takes appropriate remedial action.

The storage zones 110, 120 and 104 may include servers and/or a controller on which software may execute. The server and/or controller may include one or more of logic arrays, memories, analog circuits, digital circuits, software, firmware, and processors such as microprocessors, a field programmable gate arrays (FPGAs), application specific integrated circuits (ASICs), programmable logic device (PLDs) and programmable logic array (PLAs). The hardware and firmware components of the servers and/or controller may include various specialized units, circuits, software and interfaces for providing the functionality and features described herein. The processes, functionality and features described herein may be embodied in whole or in part in software which operates on a controller and/or one or more server computers and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some components are performed by a controller, server or other computing device, and others by other controllers, servers or other computing devices within a storage zone and/or within the distributed replicated data storage system.

The server may be a computing device. A computing device as used herein refers to any device with a processor, memory and a storage device that may execute instructions such as software including, but not limited to, personal computers, server computers, computing tablets, set top boxes, video game systems, personal video recorders, telephones, personal digital assistants (PDAs), portable computers, and laptop computers. These computing devices may run an operating system, including, for example, versions of the Linux, Unix, MS-DOS, Microsoft Windows, Solaris, Symbian, Android, Chrome, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Referring again to FIG. 2, the storage zone 104 includes a plurality of storage nodes 150 which include a plurality of storage media 160. Each of the storage nodes 150 may be an independent network attached storage (NAS) device or system. The term "storage media" is used herein to refer to any configuration of hard disk drives, solid-states drives, silicon storage devices, magnetic tape, or other similar storage media. Hard disk drives and/or other storage media 160 may also be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 500 Mbytes, 1 terabyte and 2 terabytes. Example hard disk drive specifications include Serial Attached Small Computer System Interface (SAS), Serial Advanced Technology Attachment (SATA), and others. An example storage node may include 16 one terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may, but need not, be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In another embodiment, multiple storage nodes 150 are included in a single cabinet or rack. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage node 150 may include a communications interface that allows for connection to a computing device and/or to a network. The communications interface may allow for the transmission of and receipt of information according to one or more of a variety of standards, including, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing one or more storage nodes 150 may include a network interface chip, chipset, card or device that allows for communication over a wired and/or wireless network, including Ethernet. In various embodiments, the storage node, controller or backplane may provide for and support 1, 2, 4, 8, 12, 16, etc. network connections and may have an equal number of network interfaces to achieve this.

The techniques discussed herein are described with regard to storage media including, but not limited to, hard disk drives and solid-state drives. The techniques may be implemented with other readable and writable storage media.

As used herein, a storage device is a device that allows for reading from and/or writing to a storage medium. Storage devices include hard disk drives (HDDs), solid-state drives (SSDs), DVD drives, flash memory devices, and others. Storage media include magnetic media such as hard disks and tape, flash memory, and optical disks such as CDs, DVDs and BLU-RAY® discs.

In some embodiments, files and other data may be broken into smaller portions and stored as multiple objects among multiple storage media 160 in a storage node 150. In some embodiments, files and other data may be broken into smaller portions such as objects and stored among multiple storage nodes 150 in a storage zone.

Referring again to FIG. 1, the wide area network 130 connects geographically separated storage zones. Each of the storage zones includes a local area network 140. The transfer of data between storage nodes in a storage zone is very fast. In one embodiment, the speed of data transfer internal to a storage zone is 1 Gbps. Other possible local area network data transfer speeds are, for example, 10, 40 and 100 Gbps. The data transfer speed over the wide area network 130 is slower than the data transfer speed over a local area network within a storage zone. The speed difference between the data transfer rate over the wide area network 130 when compared to the data transfer speed over a local area network 140 within a storage zone is attributed in part to the routing and other network communications overhead involved with traversing a distance and the hop to hop and network device to network device transfer of data on the wide area network 130. In one embodiment, the speed of data transfer over the wide area network 130 is 10 Mbps. Other typical wide area network data transfer speeds are, for example, 50, 100 and 500 Mbps. However, the effective throughput may be much lower over the WAN. This is typically due to latency on the WAN inherent in the communications protocols used and network devices included along the communication paths.

In the distributed replicated data storage system described herein, when writing data to a storage zone, the data may be replicated on one or more additional storage zones to provide for redundancy and/or to allow for ready (that is, quick) access from each of multiple user sites. In various embodiments, replication may be performed synchronously, that is, completed before the write operation is acknowledged; asynchronously, that is, the replicas may be written before, after or during the write of the first copy; or a combination of each.

Because of the cost of data storage devices, it is common to have only one copy of data in each storage zone of the digital replicated data storage system. In an active-passive system, because of the cost of data storage, it is common to have only one primary copy of data, the primary version at a primary location, and one or more remote replicas of the data at a remote or distant secondary location. In the example shown in FIG. 1, the original or primary copy of data may be located in storage zone 110 while a backup replica is located in storage zone 120 in a geographically different location than storage zone 110. In an active-active or fully active system, because of the cost of data storage devices, it is common to have only one copy of data at each location (or storage zone) in the system. In the example shown in FIG. 1, according to an active-active configuration, all data is stored in and readily accessible from both storage zones 110 and 120. In the active-active embodiment, there is no backup of the data stored at either zone.

The software running on a controller or server in storage zone 110 may monitor the health of the storage nodes 150 and/or the storage media 160 in the storage zone 110. When an impending or actual problem or failure is detected in the first storage zone, the first storage zone may identify impacted data. As used herein, impacted data is data that is missing, is impaired or is included on a storage device or portion thereof that has been detected as unhealthy or compromised. After identifying impacted data, the first storage zone requests that a copy of the impacted data be transmitted from a geographically remote replica storage zone, the second storage zone. However, if a copy of the impacted data is to be transferred to the first storage zone from the second storage zone located at a different geographical location over a wide area network, the system will be in a precarious and possibly reduced capability state during the time period when the transfer over the wide area network occurs. That is, during the transfer over the wide area network, the distributed replicated data storage system may not operate in a fully replicated manner as the impacted data includes missing and/or impaired data or data stored on an unhealthy or compromised storage device or portion thereof. In this way a customer of the distributed replicated data storage system may not be receiving the performance, reliability or service level desired or required. This is pertinent to both fully active storage systems and active-passive storage systems.

Because the data transfer speed over the wide area network is slower than the data transfer speed within the local area network within a storage zone, according to the methods described herein, the distributed replicated data storage system makes a copy of the replica of the impacted data at the remote location, the second storage zone, before transferring the impacted data to the first storage zone. This is done so that if during the transfer of the impacted data from the second storage zone to the first storage zone an actual or impending problem is detected or an actual problem or failure occurs to the impacted data at the second location, a copy of the replica data will still exist. This averts any data loss that could result from a failure of the replica during transfer of the replica from the second storage zone to the first storage zone. In this way, the impacted data is re-protected before the impacted data is transferred from the second location to the first location.

DESCRIPTION OF PROCESSES

Figure 3:
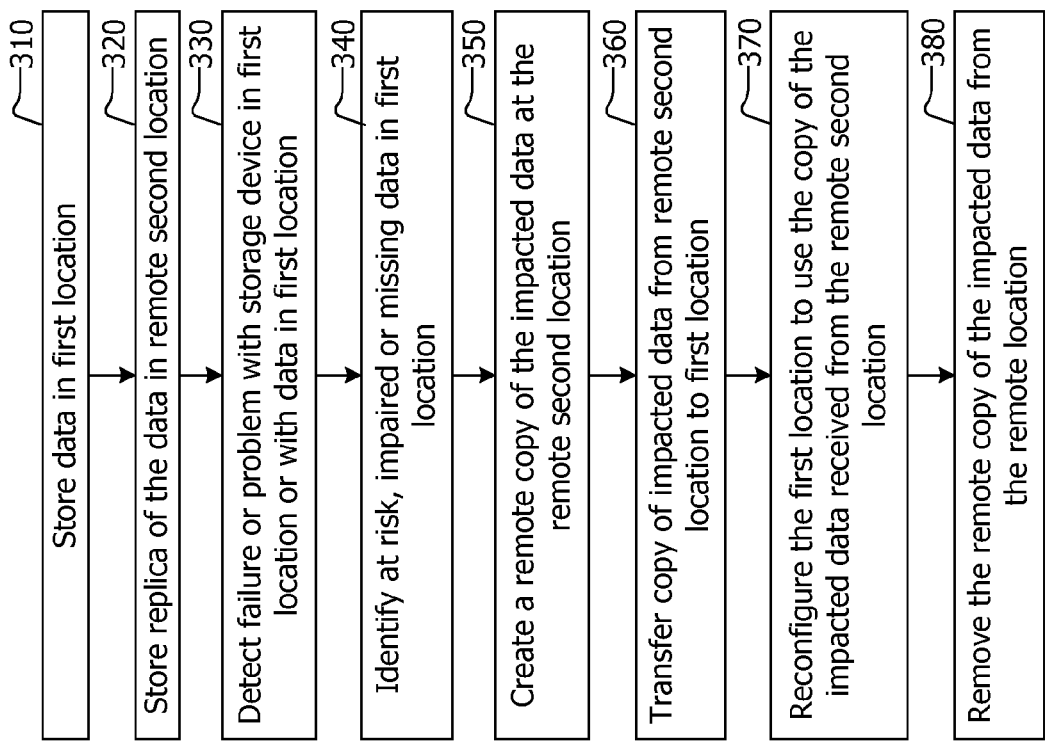
FIG. 3 is a flow chart of the actions taken to re-protect data included in a storage zone of a distributed replicated data storage system.

FIG. 3 is a flow chart of the actions taken to re-protect data included in a storage zone of a distributed replicated data storage system. The system stores data in a first location, such as a first storage zone at a first location (see 110 in FIG. 1), as shown in block 310. The system stores a replica of the data in a remote location, such as a second storage zone at a second location different and separate from the first location (see 120 in FIG. 1), as shown in block 320. The system may detect an actual or impending failure or problem with a storage device in the first location and/or with the data in the first storage zone, as shown in block 330. The system may do this by detecting at risk data, impaired data and missing data. Upon detecting an actual or impending failure, the system automatically begins to create a healthy version of the pertinent data at the first location. To do this, the system identifies at risk, impaired or missing data in the first location, referred to as impacted data, as shown in block 340. The impacted data is, in one embodiment, a plurality of objects designated by object identifiers. The system then creates a remote copy of the replica of the impacted data at the remote location, that is, at the second storage zone (120), as shown in block 350. Only the objects specified as impacted data are copied. No other data need be copied. The remote copy of the replica of the impacted data is created relatively quickly as the data is transferred at a relatively high rate of speed within a local area network of the second storage zone. That is, the inter storage node and/or inter storage device throughput and data transfer speed are high when compared to making a copy of the impacted data over the wide area network from the second zone to the first zone. The making of the remote copy at the second zone provides for the fastest possible re-protection of the data at risk in the first location. That is, in this example, according to the methods described herein, either there will always be two healthy copies of the impacted data or the period of time when there is only one healthy copy will be reduced or minimized. If a copy of the impacted data was made directly over the wide area network, the replicated nature of the storage system would be at risk or would be compromised for a greater amount of time when compared to using the methods described herein. By using the methods described herein, the replicated nature of the storage system remains intact and the data remains secure.

In one embodiment, where the impacted data is located on one storage device within the second storage zone, the copy is made to a different storage device within the second storage zone (which may be within or external to a particular storage node) to reduce the risk of failure should the storage device in the second storage zone on which the impacted data is stored fails. In another embodiment, where the impacted data is located on one node within the second storage zone, a copy of the impacted data is made to a different node within the second storage zone to reduce the risk of failure should the node on which the impacted data is stored fails. In another embodiment, where the impacted data is located on a first group of two or more nodes within the second storage zone, a copy of the impacted data is made to a second different group of two or more nodes within the second storage zone such that there is no overlap between the nodes included in the first and second groups of storage nodes. The distribution of the data between two different groups of nodes, without shared nodes, is arranged to reduce the risk of failure should the first group of nodes on which the impacted data is stored fails.

The copy of the impacted data at the second location serves as insurance should a problem occur with the storage node or storage medium on which the impacted data is stored at the second location.

The system then transfers the copy of the impacted data from the remote second location to the first location over a wide area network, such as from the second storage zone at the second location (120) to the first storage zone at the first location (110), as shown in block 360. The system may use either or both the impacted data at the second location or the copy of the impacted data at the second location to transfer the impacted data from the second location to the first location during the reconfiguration of the impacted data at the first location.

The system then reconfigures the first location to use and access the copy of the impacted data received from remote second location in place of the at risk, impaired or missing impacted data, as shown in block 370. In the example shown in FIG. 1, system then reconfigures the first storage zone 110 to use the copy of the impacted data received from the remote second storage zone 120 in place of the impaired, at risk or missing impacted data.

As an extra precaution, more than one copy of the impacted data may be made at the first location. This may be done as a precautionary measure in the event a storage device or a storage node of the first storage zone proves to be unstable. After the impacted data at the first location has been reconfigured such that there are no actual or impending problems or failures at the first location, the system may remove the remote copy of the impacted data from the remote second location, as shown in block 380. Any additional copies of the original data at the first location may be saved for a period of time in an effort to insure reliability of the data at the first storage zone and to insure the ongoing replicated nature of the storage system.

Although the examples described herein involve a first storage zone and a second storage zone, multiple storage zones may be included in the distributed replicated data storage system 100 and the methods may be implemented equally to all storage zones. Further, although the examples provided herein describe actions that result when actual or impending problems or failures are detected in the first storage zone, the same methods apply when actual or impending problems or failures are detected in the second storage zone or any other storage zones (not shown).

The methods described above and shown in FIG. 3 may be performed by and managed by a server in a distributed replicated data storage system that communicates with servers and/or controllers in constituent storage zones. In the example shows in FIG. 1, the method described above and shown in FIG. 3 may be performed by and managed by a server in distributed replicated data storage system 100 that communicates with servers and/or controllers in constituent storage zones 110 and 120. In another embodiment, the method described above and shown in FIG. 3 may be performed by and managed by a server or controller in a storage zone in a distributed replicated data storage system that communicates with other servers and/or controllers in other storage zones in the distributed replicated data storage system. Using the example shown in FIG. 1, according to this embodiment, the method described above and shown in FIG. 3 may be performed by and managed by a server or controller in a first storage zone 110 in distributed replicated data storage system 100 that communicates over wide area network 130 with a server and/or controller in second storage zone 120 in the distributed replicated data storage system 100.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method of re-protecting data included in a storage zone of a distributed replicated data storage system, the method comprising:

storing first data in a first storage zone at a first location of the distributed replicated data storage system storing a replica of the first data as replicated data in a second storage zone at a remote location as replicated data, wherein the remote location is different from and separate from the first location detecting an actual or impending failure or problem with a portion of the first data or a storage device included in the first storage zone including designating an at risk portion of the first data, a missing portion of the first data or an impaired portion of the first data as impacted data automatically transitioning to a replacement copy of the impacted data at the first storage zone in response to the detecting, the transitioning including creating a remote copy of the impacted data from the replicated data at the second storage zone at the remote location within a local area network transferring the remote copy from the second storage zone at the remote location to the first storage zone at the first location over the wide area network reconfiguring the first location so that the copy of the impacted data is accessed in place of the impacted data.

2. The method of claim 1 wherein the first storage zone and the second storage zone each include a plurality of storage nodes.

3. The method of claim 2 wherein the plurality of storage nodes each include a plurality of storage media.

4. The method of claim 3 wherein the plurality of storage media include at least one of hard disk drives and silicon storage devices.

5. The method of claim 1 further comprising:
removing the remote copy from the second storage zone at the remote location after the reconfiguring is completed.

6. The method of claim 1 wherein the first data, the impacted data, the replicated data, the missing data, and the remote copy are all stored as and accessed as a plurality of objects.

7. The method of claim 1 wherein the distributed replicated data storage system is configured as a fully active system in which the first data and replicated are accessed regularly.

8. The method of claim 1 wherein the distributed replicated data storage system is configured as an active-passive system in which the first data is a primary data and the replicated data is accessed for backup purposes.

9. The method of claim 1 wherein an effective data transfer speed over a wide area network is slow in comparison to a local area network data transfer speed over the local area network of the second storage zone.

10. The method of claim 1 wherein a wide area network data transfer speed over the wide area network is in the range from 10 to 500 Mbps and a local area network data transfer speed over the local area network of the secondary storage zone is in the range from 1 to 100 Gbps.

11. A storage medium having instructions stored thereon which when executed by a processor cause the processor to perform actions comprising:

storing first data in a first storage zone at a first location of a distributed replicated data storage system storing a replica of the first data as replicated data in a second storage zone at a remote location as replicated data, wherein the remote location is different from and separate from the first location detecting an actual or impending failure or problem with a portion of the first data or a storage device included in the first storage zone, including designating an at risk portion of the first data, a missing portion of the first data or an impaired portion of the first data as impacted data automatically transitioning to a replacement copy of the impacted data at the first storage zone in response to the detecting, the transitioning including creating a remote copy of the impacted data from the replicated data at the second zone at the remote location within a local area network transferring the remote copy from the second storage zone at the remote location to the first storage zone at the first location over the wide area network reconfiguring the first location so that the copy of the impacted data is accessed in place of the impacted data.

12. The storage medium of claim 11 wherein the first storage zone and the second storage zone each include a plurality of storage nodes.

13. The storage medium of claim 12 wherein the plurality of storage nodes each include a plurality of storage media.

14. The storage medium of claim 13 wherein the plurality of storage media include at least one of hard disk drives and silicon storage devices.

15. The storage medium of claim 11 having further instructions which when executed cause the processor to perform further actions comprising:
removing the remote copy from the second storage zone at the remote location after the reconfiguring is completed.

16. The storage medium of claim 11 wherein the first data, the impacted data, the replicated data, the missing data, and the remote copy are all stored as and accessed as a plurality of objects.

17. The storage medium of claim 11 wherein the distributed replicated data storage system is configured as a fully active system in which the first data and replicated data are accessed regularly.

18. The storage medium of claim 11 wherein the distributed replicated data storage system is configured as an active-passive system in which the first data is accessed as primary data and the replicated data is accessed for backup purposes.

19. The storage medium of claim 11 wherein an effective data transfer speed over a wide area network is slow in comparison to a local area network data transfer speed over the local area network of the second storage zone.

20. The storage medium of claim 11 wherein a wide area network data transfer speed over the wide area network is in the range from 10 to 500 Mbps and a local area network data transfer speed over the local area network of the secondary storage zone is in the range from 1 to 100 Gbps.

21. A computing device to manage a plurality of storage nodes of storage devices arranged as two or more storage zones in a distributed replicated data storage system, the computing device comprising:

a processor;

a memory coupled with the processor;

a computer readable storage medium having instructions stored thereon which when executed cause the computing device to perform actions comprising:

storing first data in a first storage zone at a first location of the distributed replicated data storage system storing a replica of the first data as replicated data in a second storage zone at a remote location as replicated data, wherein the remote location is different from and separate from the first location detecting an actual or impending failure or problem with a portion of the first data or a storage device included in the first storage zone, including designating an at risk portion of the first data, a missing portion of the first data or an impaired portion of the first data as impacted data automatically transitioning to a replacement copy of the impacted data at the first storage zone in response to the detecting, the transitioning including creating a remote copy of the impacted data from the replicated data at the second zone at the remote location within a local area network transferring the remote copy from the second storage zone at the remote location to the first storage zone at the first location over the wide area network reconfiguring the first location so that the copy of the impacted data is accessed in place of the impacted data.

22. The computing device of claim 21 wherein the first storage zone and the second storage zone each include a plurality of storage nodes.

23. The computing device of claim 22 wherein the plurality of storage nodes each include a plurality of storage media.

24. The computing device of claim 23 wherein the plurality of storage media include at least one of hard disk drives and silicon storage devices.

25. The computing device of claim 21 wherein the computer readable storage medium has further instructions which when executed cause the computing device to perform further actions comprising:
removing the remote copy from the second storage zone at the remote location after the reconfiguring is completed.

26. The computing device of claim 21 wherein the first data, the replicated data, the impacted data, the missing data, and the remote copy are all stored as and accessed as a plurality of objects.

27. The computing device of claim 21 wherein the distributed replicated data storage system is configured as a fully active system in which the first data and replicated data are accessed regularly.

28. The computing device of claim 21 wherein the distributed replicated data storage system is configured as an active-passive system in which the first data is accessed as primary data and the replicated data is accessed for backup purposes.

29. The computing device of claim 21 wherein an effective data transfer speed over a wide area network is slow in comparison to a local area network data transfer speed over the local area network of the second storage zone.

30. The computing device of claim 21 wherein a wide area network data transfer speed over the wide area network is in the range from 10 to 500 Mbps and a local area network data transfer speed over the local area network of the secondary storage zone is in the range from 1 to 100 Gbps.

* * * * *